UNITED STATES PATENT OFFICE.

ADOLPHE SEIGLE, OF LYONS, FRANCE.

MANUFACTURE OF ARTIFICIAL BUILDING MATERIAL.

SPECIFICATION forming part of Letters Patent No. 740,188, dated September 29, 1903.

Application filed January 3, 1903. Serial No. 137,700. (No specimens.)

*To all whom it may concern:*

Be it known that I, ADOLPHE SEIGLE, a citizen of France, residing at Lyons, Rhône, France, have invented certain new and useful Improvements in the Manufacture of Artificial Building Materials, of which the following is a specification.

The invention relates to the manufacture of artificial materials in which the chemical combination of silica with lime is obtained by the action of steam under pressure. In industrial practice this process of manufacture necessitates great care to avoid the numerous causes of non-success which may arise, particularly from the more or less good slaking of the lime, from its more or less perfect diffusion in the sandy mass, and, above all, from its reaction more or less immediate and more or less regular with the silica.

The process forming the object of the present invention has for its result to suppress or at least to considerably attenuate the various causes of non-success above indicated and to permit an easy and methodical manufacture of bricks or monoliths having better appearance and regularly more homogeneous and durable than the ordinary silici-calcareous bricks or stones.

The work is ordinarily effected in the following manner: Having, on the one hand, sand containing at least fifty per cent. of silica and, on the other, slaked lime in powder, the operation is commenced by carefully mixing this lime with a certain quantity of well-pulverized calcined calamin. The sand is then carefully mixed with the mixture of lime and calamin in the proportion of about ninety per cent. of sand to ten per cent. of limed calamin. The mass is then moistened, so as to obtain a sufficiently plastic paste. The molding of the paste thus made is then effected in ordinary molds of suitable forms. When the molds are filled, the compression and removal from the molds are proceeded with by known means. The molded products are then during a period of from eight to twelve hours submitted in close chambers or autoclaves to the action of steam at a pressure of six to eight kilograms. On their removal the bricks or materials are ready for use as soon as they are cold. If the bricks or monoliths can only be submitted to low-pressure steam, the operation must be continued for a much longer period than when a pressure of seven to eight kilograms is used.

By the combination of the successive operations above described beautiful monoliths are produced which are very compact and very durable in consequence of the formation in the body of the mass of a double hydrosilicate of zinc and lime.

The above-mentioned hydrosilicate is a perfectly-defined and very stable salt, not subject by either rain or river water or sea-water to the double decompositions to which the hydrosilicates inclosing too great proportions of magnesia or alumina are exposed. It is therefore necessary to avoid the employment of lime or calamin which contain magnesia or alumina in too large proportion, for, as is known by lime and cement chemical experts, the alumina and magnesia if they are in too large proportions placed in presence of silica and lime form complex combinations, giving place to consecutive reactions, which sooner or later are very injurious to the solidity and consistence of the products. On the contrary, the adjunction of twenty to thirty per cent. of calcined calamin (or, in other words, of a mixture of natural silicate of zinc and oxid of zinc) to lime, as pure as possible, facilitates the regular formation of very solid and very stable products.

The calcined calamin can be replaced by an equivalent proportion of oxid of zinc, to which alkaline silicates are added, as required; but calamin is preferred, which is a natural product, the numerous sources of which existing throughout all regions of the world insure the supply at a relatively low price.

The calamin must not be calcined at too high a temperature, as otherwise the silicate of zinc, having become more abundant and less easily transformable under the action of steam, would no longer lend itself so well to the reactions of hardening of the sandy mass by the formation of a hydrosilicate of lime and zinc.

Without departing from the principle of the invention the above-described order of the first operations can be varied. Thus in place of slaking the lime before its mixture with the calcined calamin the slaking can be effected after this mixture.

When improved moistening-mixers are available, the silicious sand can be mixed with the powder of quick or caustic lime and with the calcined calamin, also in powder. Then the methodic and gradual moistening of this mixture can be effected until its transformation into a plastic paste. Finally the mode of procedure depends on the apparatus of the works in which the process may be applied. Further, the methods of operation, as also the proportions above indicated for the sand, the calamin, and the lime, are given solely as examples. They will vary according to the available means of manufacture and according to the nature of the sand and of the other chief materials and according to the conditions of utilization of the monoliths in manufacture.

What I claim as my invention, and desire to secure by Letters Patent, is—

1. In the manufacture of artificial building materials in which silica and lime are chemically combined by the action of steam under pressure, the process which consists in combining with the lime and silica well pulverized calamin, substantially as herein set forth.

2. The manufacture of artificial building materials by the following process, viz: calamin is calcined, it is then carefully mixed with lime, sand is then mixed with the mixture of lime and calamin in the proportion of about ninety per cent. of sand to ten per cent. of limed calamin, the mass is moistened to obtain a sufficiently plastic paste, the paste is then molded, pressed and removed from the molds, and the molded products are submitted in close chambers to the action of steam at a pressure of six to eight kilograms, substantially as herein set forth.

In witness whereof I have hereunto set my hand in presence of two witnesses.

ADOLPHE SEIGLE.

Witnesses:
GASTON JEAUNIAUX,
MARIN VACHON.